March 1, 1966 R. P. PEARSON 3,238,391
TRANSIENT ENERGY REDUCING APPARATUS
Filed April 24, 1962
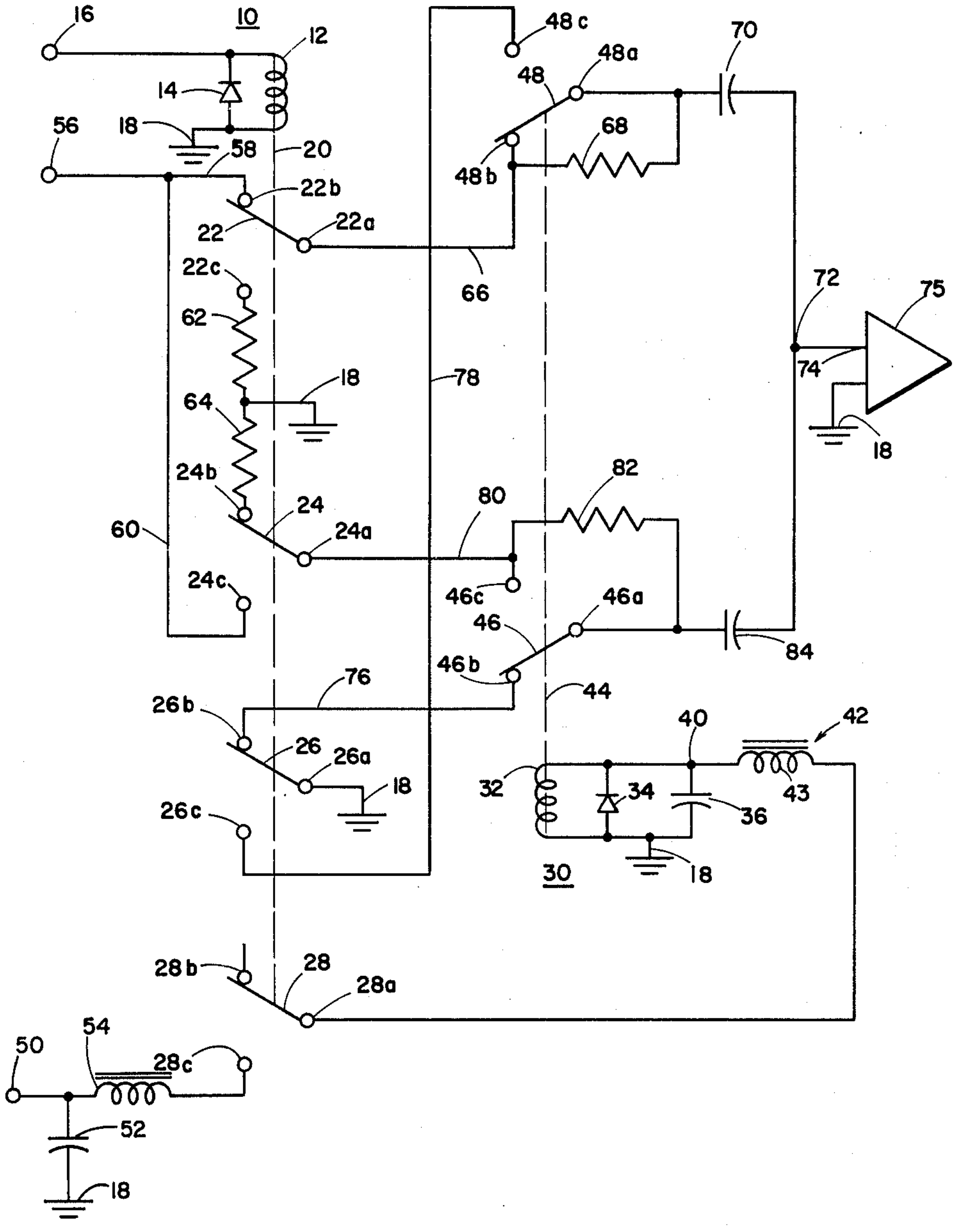
INVENTOR.
ROBERT P. PEARSON
BY Roger W. Jensen
ATTORNEY.

United States Patent Office 3,238,391

Patented Mar. 1, 1966

3,238,391

TRANSIENT ENERGY REDUCING APPARATUS

Robert P. Pearson, St. Paul, Minn., assignor to Honeywell Inc., a corporation of Delaware Filed Apr. 24, 1962, Ser. No. 189,901
8 Claims. (Cl. 307—93)

This invention pertains generally to switching circuitry and more specifically to circuitry whereby a capacitor may be switched into or out of a circuit without producing the high energy spikes normally associated with applying a voltage across a capacitor. Even more specifically this invention pertains to preventing radio noise frequency energy pulses from occurring when tank units in a bridge are used alternatively depending upon the attitude of an airplane utilizing the capacitive sensing probes.

Briefly, the invention involves the use of two relays whereby one relay operates the second relay. There is a time delay between the operation of the first relay and the operation of the second relay, and during this time resistors are inserted in series with the capacitive units to reduce the amplitude of the energy pulse. The operation of the second relay then proceeds to short circuit the series resistors and connect the capacitive units directly in the circuit without the error inducing resistance or impedance normally associated with reduction of energy pulses as has been known in the prior art.

It is an object of this invention to provide circuitry whereby energy pulses due to applying a voltage across a capacitor can be reduced in amplitude without unduly interfering with normal circuit operation.

Another object of this invention is to reduce the amplitude of radio noise signals accompanying the switching from one tank unit to another tank unit in an airplane fuel gaging circuit as the airplane changes in attitude.

Further objects and advantages of this invention will be realized after reading the following detailed specification and appended claims in conjunction with the single figure showing the circuit diagram of the invention.

The relay generally designated as 10 has winding 12 connected in parallel with a diode means or a rectifier means 14 between a power terminal 16 and ground or reference potential 18. The power terminal 16 may supply alternating voltage or a direct voltage depending upon the construction of the relay 10. The diode means 14 is placed in parallel with the winding 12 of relay 10 to prevent or reduce the high inductive voltage kick produced when a magnetic coil is suddenly de-energized. An armature represented by dashed line 20 of the relay 10, operates movable contacts 22, 24, 26, and 28. The movable contact 22 always is in connection with contact **22*a* and is normally contacting contact 22*b* when the relay 10 is unenergized while contacting contact 22*c*** when the relay is energized. The subletters *a*, *b*, and *c* are used in the similar portions of movable contacts 24, 26, and 28 such that the subletter *a* is the terminal always connected to the movable contact, subletter *b* represents the unenergized contacting terminal and subletter *c* represents the energized contacting terminal. Another relay generally designated as 30 has an armature winding 32 connected in parallel with a diode means or rectifier means 34 and a capacitor or capacitance means 36 between ground 18 and a junction point 40. The diode means 34 reduces the amplitude of the inductive voltage spike in a manner similar to that provided by diode means 14. An inductance or impedance means 42 has one end of a winding 43 connected to junction point 40 and the other end of the winding connected to terminal **28*a*. An armature generally represented by the dashed line 44 of the relay 30 controls movable contacts 46 and 48** wherein the subletters *a*, *b*, and *c* are representative of the permanently connected terminals, the normally connecting unenergized terminals and the energized connecting terminals as described before in conjunction with relay 10. A power input terminal 50 is connected to ground 18 through a capacitance means 52 and to the normally open contact **28*c* of the relay 10 through an inductance or impedance means 54. A signal input terminal 56 is connected by a lead 58 to normally closed contact 22*b* and by a lead 60 to normally open contact 24*c*. An impedance means or resistance means 62 is connected between normally open contact 22*c* and ground 18. Another impedance means or resistance means 64 is connected between normally closed contact 24*b* and ground 18. Contact 22 which is connected to terminal 22*a* is connected by a lead 66 to normally closed contact 48*b* of relay 30. An impedance means or resistance means 68 is connected between the normally closed contact 48*b* and the terminal 48*a*. A capacitor, reactance means, or transient producing means 70 is connected between the terminal 48*a* and an output means or junction point 72. The output means 72 is connected to an input 74 of an amplifier means 75 which has another input connected to ground 18. In an actual circuit utilizing the signal from input 56, the amplifier 75 would have output leads, however, they are not shown and are not necessary for an adequate description of this invention. Terminal 26*a* is connected to ground 18 while terminal 26*b* is connected by a lead 76 to normally closed contact or terminal 46*b*. Normally open contact or terminal 26*c* is connected by a lead 78 to the normally open contact 48*c*. Terminal 24*a* is connected by a lead 80 to the normally open contact 46*c*. An impedance means or resistance means 82 is connected between the normally open contact 46*c* and the terminal 46*a*. A capacitive means, reactance means, or transient producing means 84 is connected between the contact or terminal 46*a* and the output means 72**.

It may be assumed that a signal is being applied to terminal 56 and this signal is therefore directly connected through lead 58, contact **22*b*, movable contact 22, terminal 22*a*, lead 66, normally closed contact 48*b*, movable contact 48, terminal 48*a*, capacitor 70, output means 72 to the amplifier input 74 of the amplifier 75. As can be traced in the figure, the capacitance 84 is connected to ground 18 through the movable contacts 46 and 26. It will be noted that capacitor 70 is connected directly between the input 56 and the output 72 without any interfering error producing impedances and that the capacitance means 84 is connected directly to ground. If a direct voltage is now applied to terminal 16, the voltage applied being indicative of a condition such as attitude, the relay 10 will operate thereby moving all of the contacts to the normally open position. In this new position, it will be noted that capacitance means 70 is now connected to ground 18 through the resistance or impedance means 62 even though the movable contact 28 is now contacting the power source terminal 50 through the normally open contact 28*c*. The power source connected to terminal 50 is normally energized. A time delay provided both by the inductance of the relay in resisting a change and in the capacitance means 36 prevents immediate operation of the relay 30. This allows the capacitance means 70 to discharge at a much slower rate than would be the case if it were connected directly to ground. The capacitance means 84 is now connected to the input 56 through the impedance means 82, the movable contact 24 and the normally open contact 24*c*. As will be noted, the capacitor 84 is more slowly charged to the voltage being applied at input 56** than would be the case if no series impedance were present. The time delay inherent to relay 30 then is ended and the relay 30 operates closing movable contacts 46 and 48 to their normally open conditions or connections. In this connection, the impedance means 82 is shorted and a direct connection is provided from the input terminal 56 to the capacitance means 84. With the operation of relay 30, the impedance means 62 is bypassed so that capacitance means 70 is connected directly to ground through the movable contact 48, the normally open contact 48*c*, the normally open contact 26*c* through the movable contact 26 to ground 18.

When the power signal is removed from terminal 16, relay 10 is deenergized and the contacts 22, 24, 26, and 28 move back to the position shown in the drawing. The resistance to change of the inductance in relay coil 32 and capacitance means 36 prevents the immediate operation of relay 30 so that initially the impedance means 68 is placed between the input terminal 56 and the capacitance means 70 and the impedance means 64 is placed between ground and the capacitive means 84. After the time delay designed into the circuit has passed, the relay 30 deenergizes and directly connects capacitance means 84 to ground through movable contact 26 and shorts out the impedance means 68 so that impedance means or capacitance means 70 is connected directly between the input 56 and the output means 72.

One application of this circuit is to incorporate it in a bridge network wherein it is essential that interfering impedances be eliminated during normal operation of the circuit. If the impedances are removed, the radio noise signals produced upon sudden charging or discharging of the capacitance means 70 and 84 is detrimental to operation of the aircraft. By utilizing this circuit, the radio noise interference is reduced to an acceptable value and one capacitance means or the other is inserted in the bridge circuit dependent on the attitude of the airplane as to which sensor will provide the greatest accuracy in measuring fuel quantities.

It must be realized however, that this circuit is applicable to other areas of interest than bridge circuits and fuel gaging apparatus in that the invention is not restricted to a plurality of reactance means. It may be desirable in some instances to have a single capacitor in a circuit wherein the energizing current is reduced in amplitude to prevent damage to other parts of a circuit or system. In this case, parts of the figure shown, namely the movable contacts 22 and 26 associated with relay 10 and the movable contact 48 associated with relay 30 and the necessary impedances 62 and 68, can be used to switch only capacitance means 70 in and out of a circuit. This might be desirable in some types of motor starting circuits, or power supply circuits.

While I have described one embodiment of the invention, and several applications, I do not wish to be limited to the description given but only by the scope of the appended claims which are intended to cover all modifications which do not depart from the scope and spirit of the invention.

I claim:

1. Apparatus for reducing the magnitude of energy pulses incident to switching circuitry utilizing capacitance means comprising, in combination:

first and second switching means each having first and second energization conditions and each including a plurality of electrical contacting means, said second switching means being controlled by said first switching means and being adapted to change from said first condition to said second condition after said first switching means changes from said first condition to said second condition;

first and second capacitance means;

means for supplying an input;

output means for receiving an output signal from the switching circuitry;

means connecting said first capacitance means between said means for supplying an input signal and said amplifier means and connecting said second capacitance means to a ground connection when said first and second switching means are in the first condition;

means connecting said second capacitance means between said means for supplying an input signal and said amplifier means and connecting said first capacitance means to the ground connection when said first and second switching means are in the second condition;

and means for connecting resistance means in series connection with said capacitance means for the period of time delay between operation of said first switching means and operation of said second switching means.

2. Apparatus for reducing the magnitude of energy pulses incident to switching circuitry involving reactances comprising, in combination:

first and second switching means each having first and second energization conditions and each including a plurality of electrical contacting means, said second switching means being controlled by said first switching means and being adapted to change from one condition to the other condition after said first switching means changes from one condition to the other condition;

first and second reactance means;

means for supplying an input;

output means for receiving an output signal from the switching circuitry;

means connecting said first reactance means between said means for supplying an input signal and said output means and connecting said second reactance means to a ground connection when said first and second switching means are in the first condition;

means connecting said second reactnace means between said means for supplying an input signal and said amplifier means and connecting said first reactance means to the ground connection when said first and second switch means are in the second condition;

and means for connecting impedance means in series connection with said reactance means for the period of time between operation of said first switching means and operation of said second switching means.

3. Apparatus for reducing the magnitude of transients incident to switching circuitry comprising, in combination:

first and second switching means each having first and second energization conditions, said second switching means being controlled by said first switching means and being adapted to change from one condition to the other condition after said first switching means changes from one condition to the other condition; first and second transient producing means;

means for supplying an input;

output means;

means connecting said first transient producing means between said means for supplying an input signal and said output means and connecting said second transient producing means to a reference potential when said first and second switching means are in the first condition;

means connecting said second transient producing means between said means for supplying an input signal and said amplifier means and connecting said second transient producing means to the reference potential when said first and second switching means are in the second condition;

and means for connecting impedance means in series connection with said transient producing means for the period of time between operation of said first switching means and operation of said second switching means.

4. Apparatus for reducing the amplitude of radio frequency type signals when switching from one reactance to another comprising, in combination:

first switching means having a plurality of contacts and operable to close one set of contacts in a first energizing condition and to close another set of contacts in a second energizing condition;

second switching means having a plurality of contacts and operable to close one set of contacts in a first energizing condition and to close another set of contacts in a second energizing condition, said second switching means being controlled as to its condition by said first switching means and said second switching means being adapted to change conditions after said first switching means changes conditions;

first and second series reactance-resistance combinations; input circuit means;

output circuit means;

means connecting one of said reactances between said input and said output circuit means through said contacts of said switching means while connecting the other one of said reactances to a reference potential when said first and second switching means are both in said first energizing condition;

and means connecting said resistance in series with each of said reactances during the times between operation of said first switching means and operation of said second switching means.

5. Apparatus for reducing the amplitude of radio frequency type signals when switching a reactance in a circuit comprising, in combination:

first switching means having a plurality of contacts and operable to close one set of contacts in a first energizing condition and to close another set of contacts in a second energizing condition;

second switching means having a plurality of contacts and operable to close at least one contact in a first energizing condition and to close at least another contact in a second energizing condition, said second switching means being controlled as to its condition by said first switching means and said second switching means being adapted to change conditions after said first switching means changes conditions;

resistance means connected in series with the reactance;

input circuit means;

output circuit means;

means connecting said reactance between said input and said output circuit means through said contacts of said switching means;

and means connecting said resistance means in series with said reactance during the time between operation of said first switching means and operation of said second switching means.

6. Apparatus for eliminating the short duration pulse of energy which accompanies the connection of a capacitor to a source of electrical energy comprising, in combination:

a resistor connected in series with the capacitor;

means for supplying electrical energy;

first switch means connected to and operable in a first position to short circuit said resistor;

and second switch means connected to said means for supplying electrical energy and operable in a first position to connect said means for supplying electrical energy to the series connected capacitor and resistor and to energize means for causing operation of said first switch means to the first position, said resistor thereby being short circuited to provide a direct connection between said means for supplying electrical energy and the capacitor.

7. Apparatus for eliminating the short duration pulse of energy which accompanies the connection of a reactance to a source of voltage comprising, in combination:

resistance means connected in series with the reactance;

means for supplying a voltage first switch means connected to said resistance means and operable in a first position to short circuit said resistance means;

and second switch means connected to said means for supplying a voltage and operable in a first position to connect said means for supplying a voltage to the series connected reactance means and resistance means and to energize means for causing operation of said first switch means to the first position, said resistance means thereby being short circuited to provide a direct connection between the source of voltage and the reactance.

8. Apparatus adapted to reduce the amplitude of energy pulses comprising, in combination:

first and second impedance means;

reactance means;

input means;

a reference point;

switching means including first and second sets of contacts whereby said second set of contacts operate after first set of contacts operate;

and means connecting said switching means to said first and second impedance means, to said reactance means, and to said input means and said reference point, said switching means operably connecting one of said impedance means in series with said reactance means between the time of operation of said first set of contacts and said second set of contacts.

References Cited by the Examiner

UNITED STATES PATENTS

| | | | |
|---|---|---|---|
| 2,120,855 | 6/1938 | Buell | 307—93 X |
| 2,320,224 | 5/1943 | Edwards | 307—93 X |

LLOYD McCOLLUM, *Primary Examiner.*

T. J. MADDEN, *Assistant Examiner.*